United States Patent [19]

Goyal

[11] Patent Number: 5,059,331

[45] Date of Patent: Oct. 22, 1991

[54] SOLIDS-LIQUID SEPARATION

[75] Inventor: Shri K. Goyal, Naperville, Ill.

[73] Assignee: Amoco Corporation, Chicago, Ill.

[21] Appl. No.: 489,368

[22] Filed: Mar. 6, 1990

[51] Int. Cl.⁵ .............................................. B01D 29/52
[52] U.S. Cl. .................................... 210/748; 210/785; 210/412
[58] Field of Search ............... 210/785, 748, 412, 411, 210/333.01

[56] References Cited

U.S. PATENT DOCUMENTS 3,960,731 6/1976 Brandt ............................ 210/785 X
4,256,583 8/1981 Lennartz ........................ 210/340 X

FOREIGN PATENT DOCUMENTS 0210213 6/1984 Fed. Rep. of Germany ...... 210/785

Primary Examiner—Frank Spear
Attorney, Agent, or Firm—Nick C. Kottis; William H. Magidson; Ralph C. Medhurst

[57] ABSTRACT

A method and a system for separating solids from a solids-containing liquid feed is disclosed wherein ultrasonic energy is applied to a fouled separation element in situ in the separator unit associated with the element while the element is immersed in a liquid to effect removal therefrom of solids fouling the elements and wherein the separation element is backflushed with a backflush liquid.

32 Claims, 3 Drawing Sheets

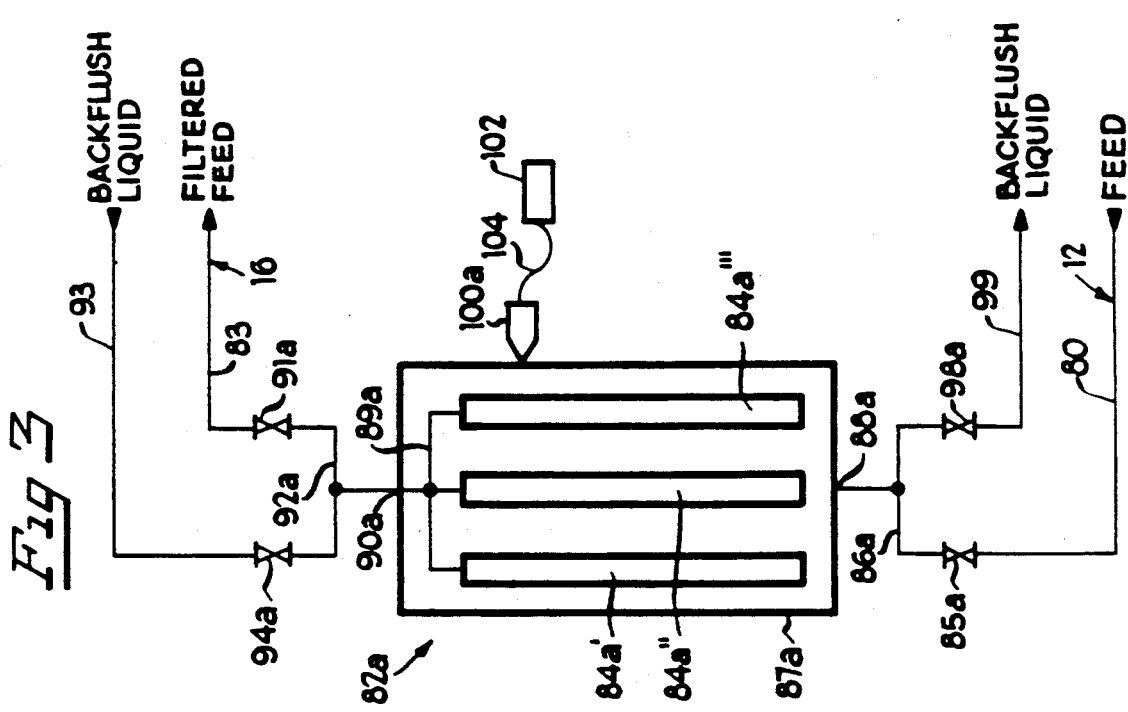

SOLIDS-LIQUID SEPARATION

BACKGROUND OF THE INVENTION

This invention relates generally to material separation and, more particularly, to the removal of fouling matter which forms or collects on processing equipment during separation processing, such as the separation of solids from liquid.

As separation processes generally involve the transformation of a mixture of substances into two or more products which differ from each other in composition and/or physical properties, solids-liquid separation involves the separation of two phases, e.g., solid and liquid, from a mixture. Solids-liquid separation techniques find wide use in petroleum and oil feedstock refining; chemical manufacturing, including pharmaceutical production; pollution control; and many manufacturing processes, including food (e.g., fruit and vegetable juice processing), agricultural (e.g., food grain processing) metallurgy (e.g., steel processing) and semiconductor production, for example.

A common solids-liquid separation technique involves surface filtration which is essentially a straining mechanism whereby solid particles are screened, e.g., filtered, from a solids-liquid feed stream onto a matrix element, e.g., a filter, characterized as having a controlled pore size. In such surface filtration, the flow rate of liquid through the filter decreases as solids accumulate and plug pores of the matrix.

In general, the ways in which particles interact with the pores and surface of the matrix and result in plugging of the matrix surface are not well understood. As a result, it is common to simply run filtration tests using a sample of the particular solids-containing liquid feed to be filtered and a filter matrix (i.e., test matrix) having pores small enough to produce a filtrate having suitably desired clarity. The matrix surface area required for a designed filtration system can be estimated by measuring the volume of the sample feed which passes through the test matrix before the test matrix becomes unsuitably plugged. This measured volume can then be scaled up in direct ratio to the surface area of the test matrix to calculate the surface area required of the matrix for the designed filtration system.

When a matrix element becomes undesirably plugged or clogged during use, the plugged or clogged matrix element is replaced with a new matrix element which is not so plugged or clogged or, in the alternative, the plugged or clogged matrix element is subjected to cleaning treatments which are typically periodic or cyclic in nature and by which the matrix element is suitably cleaned or "unplugged."

One approach which has or can be used for the cleaning of some objects is the use of ultrasonic wave energy. In the past, when an article or element was to be cleaned ultrasonically, such an article or element was simply immersed in a liquid medium which was ultrasonically activated to produce cavitation in the liquid medium which in turn beneficially results in removal of undesired material from the article or element being cleaned. Most sonic cleaning apparatuses basically include a bath and an electrical ultrasonic wave generator. The bath (i.e., a tank or container for holding a cleaning solution) is provided with one or more magnetostrictive or electrostrictive transducers which, when energized by means of the generator, convert electrical energy to mechanical vibrations. The high-frequency, high-energy vibrations of the transducers cause cavitation of the cleaning solution at or on the surface of the article, which in turn accelerates and aids in the removal of contaminates from the article immersed in the solution.

Such an approach in its application to plugged or clogged matrix elements, however, suffers as it requires the removal of the plugged matrix element from its associated housing for insertion in the sonic cleaning bath and subjection to cleaning by action of the high-frequency, high-energy vibrations generated in the bath, with the comparatively cleaned/unplugged matrix element subsequently being returned to its housing. Such a cleaning process involving the removal of an undesirably plugged or clogged matrix element from its housing, the subjection of such a matrix element to the action produced by ultrasonic energy and the return of a comparatively clean or unplugged matrix element to its housing severely limits the period of time which the matrix element is on-stream for the processing of solids-containing liquid feed, as well as dramatically increasing the costs associated with the cleaning of matrix elements. As a result, for many applications from the perspective of direct economic costs, it is more economical to simply discard a plugged matrix element and replace it in the system with a new matrix element. Alternatively, other "cleaning" methods may be used which methods are less manually intensive and/or involve less "downtime," i.e., time for which the matrix element and/or associated housing is off-stream and not utilized for the treatment of solids-containing liquid feed.

In practice, the typical methods for cleaning or unplugging plugged or clogged matrix elements, such as filters, involve the "backflushing" of the undesirably plugged or clogged filter. In such backflushing methods, the undesirably plugged or clogged filter is taken off-stream, e.g., the flow of solids-containing liquid feed to and through the filter is discontinued. Subsequently, a backflush liquid is used to "backflush" the filter as the direction of liquid flow through the filter is reversed, with the direction of flow of the backflush liquid through the filter being reversed from the direction of flow of the solids-containing liquid feed through the filter when the filter is being used for filtration of such feed. While such reversal of flow will typically result in the dislodgement or removal of at least some of the fouling matter from the filter, the removal of the fouling matter is usually assisted through the selection of an appropriate backflushing liquid, e.g., by the use of a backflushing liquid which is at least partially solubilizing for the fouling matter or the materials adhering the fouling matter to the filter.

In practice, should the filter become severely fouled, e.g., so that the pressure drop across the filter is greater than about two to three times the design value of the pressure drop for the filter, backflushing of the fouled filter will not, at least alone, generally effect sufficient or adequate cleaning of the filter. Consequently, when primary reliance is made on backflushing to maintain the filters at proper filtering capabilities, backflushing must generally be done at sufficiently proximate intervals so as to avoid pressure drop differentials over the filter which exceed about two to three times the pressure drop design value for the specific filter.

Thus, the search for a relatively low-cost cleaning method which permits the cleaning to be done in situ and which is effective in the removal of fouling solids which are not easily removed by common techniques has continued.

Common solids-liquid separation applications associated with modern petroleum refinery operations include coking operations wherein coke, as well as gaseous and liquid products, are produced from heavy residual oil feedstocks.

In usual coking process applications, residual oil is heated in a furnace, passed through a transfer line and discharged into either a coking drum or a fluidized coking unit. During coking the residual feedstock is thermally decomposed to a very heavy tar or pitch which further decomposes into solid coke and vapor materials. The vapors formed during decomposition are ultimately recovered from the coking zone, and solid coke is left behind.

When a delayed coking operation is utilized, the residual oil is passed into a coking drum which eventually fills with a mass of solid coke. The vapors formed in the coking drum leave the top of the drum and are passed to a fractionating column where they are separated into liquid and gaseous products. Sometimes these products are recycled with residual oil feed to the coke drum.

In delayed coking operations the residual oil feed passing into the coking drum is stopped after a predetermined period of time and routed to another drum. The first drum is then purged of vapors, cooled and opened so the solid coke material which has filled the drum can be removed by drilling or other means.

In fluidized coking, a residual oil feed contacts a previously produced, hot fluidized bed of coke particles and is converted to additional coke material and lighter hydrocarbons. The coke in the fluidized bed is heated through external means which include either a gasification zone, where a part of the fluidized coke produced from the residual oil feed is burned with oxygen, or through heat exchange with a combustor.

In either type of coking operation, the refiner generally aims to minimize coke production and maximize liquid products from a residual oil feed, since liquid products are more easily converted into gasoline or other products of higher value than solid coke.

Additional solids-liquid separation applications associated with modern petroleum refinery operations include gasoline and diesel oil filtration, decanted oil filtration, pyrolized and coke oven gas filtration, filtration operation prior to processing in fixed bed reactor units associated with many operations, as well as flue gas solids removal and other environmental applications.

SUMMARY OF THE INVENTION

It is an object of the present invention to overcome one or more of the problems described above.

According to the invention, an in situ method for cleaning a solids-liquid separation element contained in an associated solids-liquid separator unit is provided. In effecting separation of specified solids from a solids-containing liquid feed to form a stream of liquid substantially free of the specified solids, solids-liquid separation elements so used become fouled with matter including solids separated from the feed. Such fouled solids-liquid separation elements can be cleaned by a method including the step of applying ultrasonic energy to the fouled separation element in situ in the separator unit associated with the element while the element is immersed in liquid in the unit. Such treatment serves to effect removal of fouling solids from the element. The cleaning method also provides backflushing the fouled separation element with a backflush liquid.

The invention also comprehends an in situ method for cleaning a filter useful in the treatment of a solids-containing liquid feed comprising a hydrocarbon-containing refinery stream including coke still gas oil resulting from the fractionation of an oil feedstock. This treatment effects a separation of a predetermined relative amount of solids with at least a preselected size from the feed to form a stream of liquid substantially free of the specified solids. During the separation, the filter becomes fouled with matter such as solids separated from the feed and fouling hydrocarbon materials from the feed. The method of cleaning the filter includes the steps of applying ultrasonic energy to a fouled filter in situ in the housing associated with the filter while the filter is immersed in a liquid in the housing to effect removal of solids which foul the filter an backflushing the filter with a backflush liquid.

In addition to the above-described methods, the invention comprehends a method for treating a solids-containing liquid feed. Such a method of treatment includes passing a solids-containing liquid feed through a first solids-liquid separator unit containing a solids-liquid separation element effective to separate specified solids from the feed to form a stream comprising liquid substantially free of the specified solids. During the passage of the solids-containing feed through the separation device, the separation element becomes fouled with matter such as the solids separated from the feed. The fouled separation element is cleaned to effect removal of solids fouling the element by a method involving application of ultrasonic energy to the fouled element in situ in the separator unit associated with the element while the element is immersed in liquid and backflushing the fouled separation element with a backflush liquid. While said cleaning is occurring, additional quantities of the feed are passed through a parallel second solids-liquid separator unit containing a second element effective to separate the specified solids from the additional quantities of the feed to form additional liquids substantially free of the specified solids.

The invention further comprehends a filtration system useful in the filtering of gas oils resulting from the fractionation of an oil feedstock. Such a system includes a filter element useful in separating specified solids from a feed which includes gas oils. The filter element is contained in a filtration unit to which is joined an ultrasonic transducer by which ultrasonic energy is periodically applied to the element when the element becomes fouled with matter, including solids separated from the feed, to effect removal of fouling solids from the element. The system also includes means for backflushing the filter element to effect removal of dislodged fouling solids.

As used herein, the terms "backflushing," "backflushing operation," "backflush processing," and the like refer to a method of or a step in a process for cleaning or unplugging undesirably plugged or clogged matrix elements, such as filters, wherein the plugged or clogged filter is taken off-stream, e.g., the flow of solids-containing liquid feed to and through the filter is discontinued and a backflush liquid is used to "backflush" the filter as the direction of flow of the backflush liquid through the filter is reversed from the direction of flow of the solids-containing liquid feed through the filter when the filter is being used for filtration of such feed.

The term "to clean" and the various forms of this term refer to effecting removal of fouling solids from the filter element and the like.

The term "cycle time" refers to the period of time a filtration element, e.g., a filter, is on-stream treating solids-containing liquid feed without exceeding the pre-set pressure drop differential over the element, typically about two to three times the pressure drop design value for the element, and without significantly changing the flow rate of the feed stream thereto.

The terms "nodal point" and "antinodal point" as used herein in reference to periodic, wave-type systems refer to a point of minimum or zero amplitude or displacement and a point of maximum amplitude or displacement, respectively.

Other objects and advantages of the invention will be apparent to those skilled in the art from the following detailed description taken in conjunction with the appended claims and drawings.

BRIEF DESCRIPTION OF THE DRAWINGS

FIG. 3 is a simplified schematic flow diagram of a filtration unit of the filtration system shown in FIG. 2.

FIGS. 4 and 5 are simplified diagrams of filtration units in accordance with alternative embodiments of the invention showing alternative arrangements for the joining of multiple transducers to the unit. FIGS. 4A and 5A being side views and FIGS. 4B and 5B being top views taken along the lines 4B—4B and 5B—5B of FIGS. 4A and 5A, respectively.

DETAILED DESCRIPTION OF THE INVENTION

Figure 1:
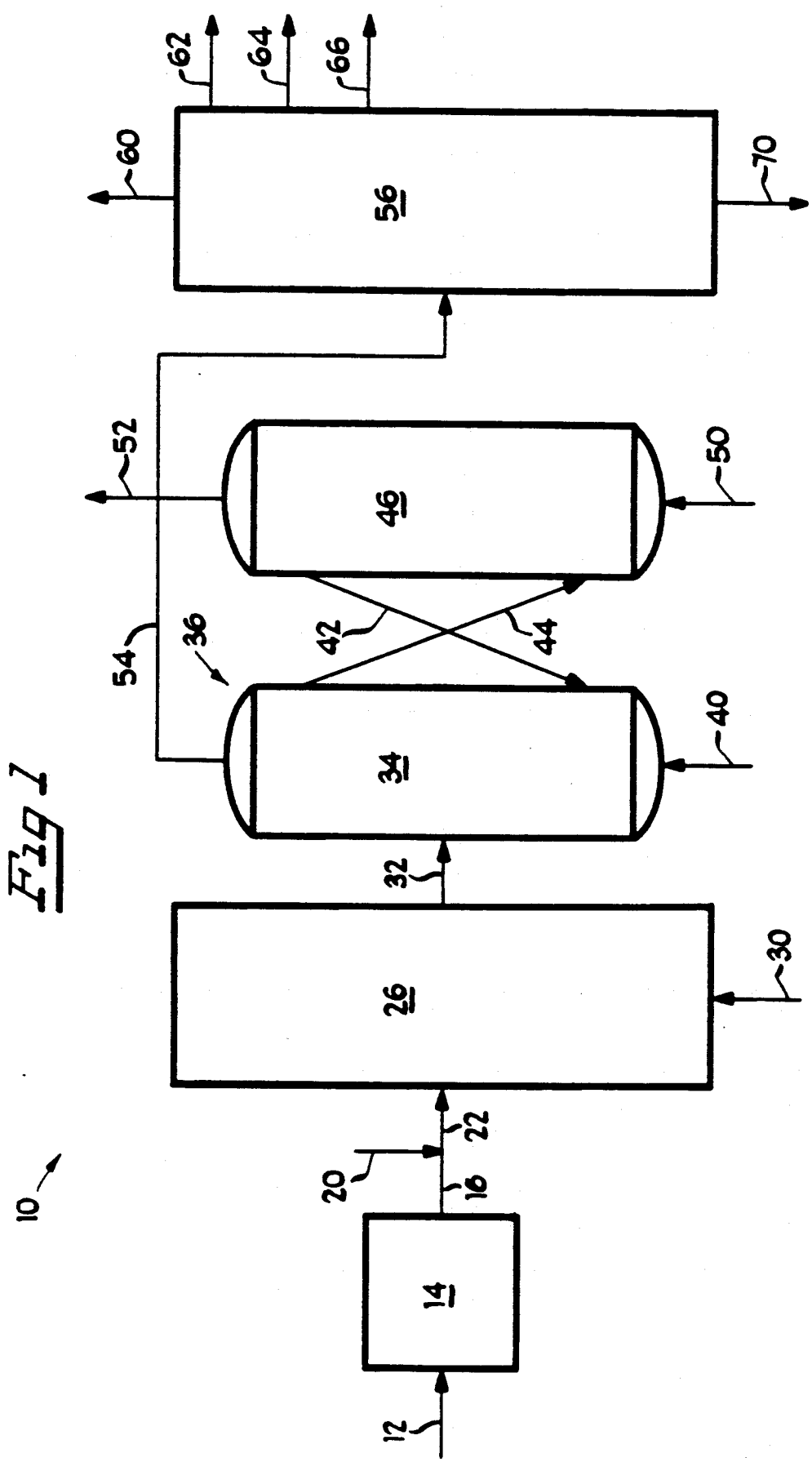
FIG. 1 is a simplified schematic flow diagram of a system for the upgrading of gas oils in accordance with one embodiment of the invention.

The invention contemplates a method and system effective in the separation of specified solids from a solids-liquid mixture.

In the in situ method for cleaning a solids-liquid separation element of the invention, ultrasonic energy is applied to a fouled separation element, i.e., a separation element fouled with matter including solids separated from the feed, in situ while the element is immersed in a liquid in its associated separator unit. In this fashion the removal of solids fouling the element can be effected. The method for cleaning of the invention also includes the step of backflushing the separation element with a backflush liquid.

While the present invention is described hereinafter with general reference to application in oil and petroleum feedstock refining wherein the solids-containing liquid feed being treated comprises a hydrocarbon-containing refinery stream and wherein the fouling matter, in addition to solids separated from the feed, may include fouling hydrocarbon materials, e.g., hydrocarbon materials which contribute to the physical fouling of the separation element. More specifically, the invention will be described with reference to the separation of specified solids from oils, particularly gas oils, and, in particular, coke still gas oils, and to the upgrading thereof, using a filter as the solids-liquid separation element and wherein the solids-liquid separator unit comprises a filter housing. The invention, however, is believed to have wide applicability and use in various processing schemes where fouling of a separator element could be a problem (for example, in processing schemes wherein the separation element comprises a filter element and wherein the filter element undesirably clogs or plugs such that the pressure drop across the filter is greater than about two to three times the design pressure drop value for the filter) and where the separation element has sufficient physical integrity to maintain its general shape and design after, as described hereinafter, application of ultrasonic energy thereto. Thus, the invention could be used in conjunction with filter elements such as those of sintered metal powder, wound wire or wire gauge, as well as nonsintered wound wire and wire gauge elements and ceramic filter elements, for example. In contrast, typical cartridge filter elements such as those commomly made from paper pulp may not be able to maintain their physical integrity upon the application of the ultrasonic energy thereto and would thus not be generally suited for use in the practice of the invention, at least to the extent that the cartridge filter would have insufficient physical integrity to withstand application of ultrasonic energy, as practiced with the subject invention.

It will also be apparent that the process and system of the invention can also be used in connection with the separation of other solids-liquid streams in refinery applications as well as the treatment of other solids-liquid streams in other material handling applications, such as those identified above and also including filtration of cooling water such as in nuclear power plant and nuclear submarine applications, for example. In addition, the method of the invention can be applied to the separation of solids from liquid streams which previously could not feasibly have been treated by filtration processes. For example, in the context of a refinery application, the method of the invention may allow the filtration of such high-fouling streams such as heavy-heavy coker gas oil, residual oil, decanted oil or fuel oils, for example. Such high-fouling streams typically contain high amounts, such as to total more than about one to five parts per million in the total stream flow, of asphaltenes or various kinds of undesirable solids such as coke, sulfur, iron and other metals, such as copper, for example. Further, the method and system of the invention can be applied or utilized in solids-gas/vapor separation as well.

Referring to FIG. 1, a system, generally designated 10, for the upgrading of gas oils, such as resulting from the fractionation of an oil feedstock and commonly produced in oil refining processing, into desirable products streams is shown.

In the system 10, a feed stream 12 of coke still gas oil such as produced in refining processing such as shown in U.S. Pat. No. 4,673,442, issued June 16, 1987, assigned to Standard Oil Company (Indiana) (now Amoco Corporation), the disclosure of which is incorporated herein by reference, is fed into a filtration system 14 (described in detail below). It is of course to be understood that, if desired, other feed materials such as light vacuum gas oil, heavy vacuum gas oil, vacuum residual oil and combinations thereof, for example, as may be desired, can be combined with the coke still gas oil of stream 12 prior to passage through the filtration system so that the hydrocarbon-containing refinery stream being subjected to treatment for solids removal will include these other feed materials.

A stream 16 of filtered coke still gas oils may, if desired, be combined with other feed materials (shown as a stream 20) such as light vacuum gas oils (LVGO), heavy vacuum gas oils (HVGO) and light catalytic cycle oil (LCCO), for example, to form a combined stream 22 which is fed into a catalytic feed hydrotreater 26 where it is hydrotreated with hydrogen from hydrogen feed line 30 in the presence of a hydrotreating catalyst. While the practice of the invention is described herein with reference to vacuum gas oils and vacuum residual oil, it is to be understood that the practice of the invention is also applicable t the treatment of virgin distillate (i.e., virgin light gas oil), virgin gas oils and atmospheric residual oils.

The hydrotreated gas oil is discharged through a discharge line 32 and conveyed and fed into the bottom of a fluid catalytic cracking reactor 34, such as the reactor of a fluid catalytic cracker (FCC) unit 36. Fresh make-up catalytic cracking catalyst and regenerated catalytic cracking catalyst are fed into the reactor 34 through fresh make-up catalyst line 40 and regenerated catalyst line 42, respectively. In the FCC reactor 34, the hydrocarbon feedstock, upon being mixed with the hot cracking catalyst, is vaporized and the feedstock is catalytically cracked to more valuable, lower molecular weight hydrocarbons.

Spent catalyst containing deactivating deposits of coke and metals is discharged from the FCC reactor 34 through spent catalyst line 44 and fed to the bottom portion of an upright, fluidized catalyst regenerator or combustor 46. The reactor 34 and regenerator 46 together provide the primary components of the FCC unit 36. Air is injected upwardly into the bottom portion of the regenerator 46 through an air injector line 50. The air is injected at a sufficient pressure and flow rate to fluidize the spent catalyst particles generally upwardly through the regenerator 46. Residual carbon (coke) contained on the catalyst particles is substantially completely combusted in the regenerator 46 leaving regenerated catalyst for use in the reactor 34. The regenerated catalyst is discharged from the regenerator 46 through regenerated catalyst line 42 and fed to the reactor 34. The combustion off-gases (i.e., flue gases such as $O_2$, $N_2$, $CO$ and $CO_2$, for example) are withdrawn from the top of the combustor 46 through an overhead combustion off-gas line or flue gas line 52.

The effluent product stream of catalytically cracked hydrocarbons is withdrawn from the top of the FCC reactor 34 through an overhead product line 54 to a FCC fractionator 56. In the FCC fractionator 56, the catalytically cracked hydrocarbons are fractionated (separated, such as by distillation) into light hydrocarbon gases, naphtha, light catalytic cycle oil (LCCO), heavy catalytic cycle oil (HCCO), and decanted oil (DCO). Light hydrocarbon gases are withdrawn from the FCC fractionator 56 through a light gas line 60. Naphtha is withdrawn from the FCC fractionator 56 through a naphtha line 62. LCCO is withdrawn from the FCC fractionator 56 through a light catalytic cycle oil line 64. HCCO is withdrawn from the FCC fractionator 56 through a heavy catalytic cycle oil line 66. Decanted oil is withdrawn from the bottom of the FCC fractionator 56 through a decanted oil line 70.

Figure 2:
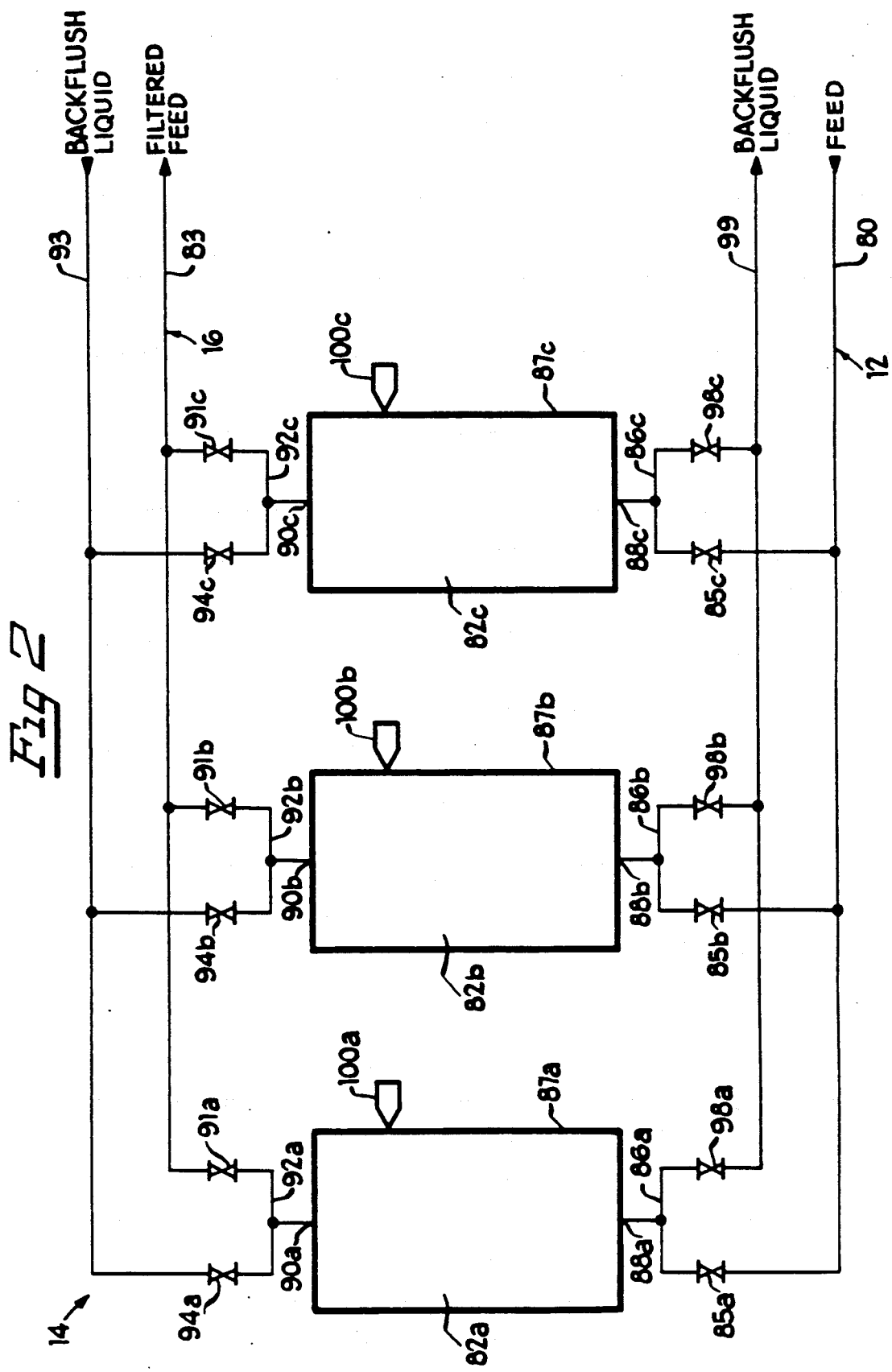
FIG. 2 is a simplified schematic flow diagram of a filtration system used in the processing of gas oils, in accordance with a preferred embodiment of the invention.

Referring to FIG. 2, a filtration system 14 in accordance for use in the practice of the invention will be described. The system 14 includes a feed line 80 through which the feed stream 12 is fed to multiple filtration units 82, which units are joined in parallel. (Each of the filtration units 82 and associated piping and connections are similar, and thus each unit and associated piping and connections are designated with a letter a, b, c, . . . etc. In addition, the number of units may vary from one to as many units as are desired for use in the particular application.)

A stream of filtered feed 16 is formed from the material exiting each of the filtration units 82 and passes through the line 83.

Each of the filtration units 82, as will be described below in reference to FIG. 3, contains three surface filtration filter elements 84 which serve to separate specified solids from the feed stream passing through the unit. (In FIG. 3, the three surface filtration filter elements 84a of unit 82a are designated 84a', 84a" and 84a''', respectively.) It is to be understood, however, that the invention, based on the principles taught herein, can be utilized in conjunction with filtration units containing one or more such filtration filter elements or with filtration systems wherein the various filtration units have the same or a differing number of such filtration filter elements therein, for example.

The invention will now be described in detail with particular reference to the filtration unit 82a, shown in more detail in FIG. 3. It is to be understood, however, that similar principles may be made applicable to other separation units of the system and, in a preferred embodiment of the invention, such other separation units are used in conjunction with such principles.

As shown in FIG. 3, the feed 12 is passed through the line 80, the feed inlet valve 85a and the associated piping 86a to the housing 87a of the unit 82a, via the port 88a.

The housing 87a of the filtration unit 82a is shown as comprising a tricluster of the filter elements 84a', 84a", and 84a''', with a filter element header piping 89a joined to each of the filter elements 84a', 84a", and 84a''', and leading to the top port 90a of the filter housing 87a of the unit 82a. The filtered feed 16 can then be fed through to line 83 through the filtered feed exit valve 91a and the associated piping 92a of the unit 82a.

As the unit 82a is used to filter feed passing therethrough from line 80 to produce filtered feed 16 for passage through the line 83, the filter elements contained in the housing 87a of the unit 82a (shown in FIG. 3 as items 84a', 84a", and 84a''') over time become clogged, fouled or otherwise structured with solid materials being separated from the feed stream.

Coke still gas oil (e.g., feed stream 12) such as produced in refining processing such as shown in U.S. Pat. No. 4,673,442 will contain undesirable solids such as fines material such as of coke or catalyst, for example, such as result from earlier processing. During the usual filtration of such solid-containing feed streams whereby specified solids, e.g., a predetermined relative amount of the solids of at least a preselected size, are separated from the coke still gas oil feed stream, such undesirable solids, e.g., catalyst fines, lodge on or in the filter element, adhere to the filter element such as by means of fouling hydrocarbon materials which act to bind solids to the filter element blocking or clogging pores in the filter element, or otherwise plug or clog the filter element so as to reduce the flow of the medium being filtered through the filter element. Typically, for such separation, the size of the solids separated from the feed stream will have a mean size of about 2 to about 50μm and generally at least about 90% of the solids within this size range will preferably be so separated and removed so that the liquid substantially free of the specified solids will preferably contain no more than about 10% of the specified solids which were present in the feed stream prior to subjection to the separation treatment.

As the degree or extent of fouling increases, the flow rate of feed through the filtration elements 84a and correspondingly through the filtration unit 82a is gradually diminished, and, if allowed to continue, would result in the filtration elements becoming totally or completely clogged or plugged. In order to maintain the system at suitable flow rate operating conditions, the filtration elements being plugged or clogged must be periodically replaced or, in accordance with the invention as it is desired to maintain the use of the same filter element, be periodically cleaned.

To effect cleaning of the filtration elements 84a of unit 82a in situ, e.g., while the filtration elements are in place in their respective filtration units, in accordance with the invention, treatment of the solids-containing liquid feed through the unit is discontinued, e.g., the flow of feed through the unit 82a is discontinued, such as by the closing of the filtered feed exit valve 91a and the feed inlet valve 85a.

Subsequently, a backflush liquid as will be described in more detail below is fed to the unit 82a through the backflush feed line 93 via a backflush liquid feed valve 94 a and the associated piping 92a of the unit 82a through the port 90a and filter element header piping 89a and thus to the filtration elements 84a. In such a fashion, the filtration elements 84a can be "backflushed" as described above, with the backflush liquid passing from the interior to the exterior of each of the filtration elements 84a', 84a'' and 84a'''. The backflush liquid will then pass through the port 88a of the housing 87a and through the associated piping 86a and the backflush liquid exit valve 98a to the backflush liquid exit line 99.

In accordance with the invention, ultrasonic energy is applied to the filtration elements 84a of the unit 82a via an ultrasonic transducer 100a to effect removal of solids fouling the filtration elements 84a, with the transducer 100a electrically connected to a high frequency generator 102 via a cable 104.

Typically, a transducer will be joined to a housing in a fashion that will permit the efficient transfer of ultrasonic energy. For example, a preferred method of joining a transducer to a filter housing is by means of welding, preferably surface welding whereby weld filler metal is applied in layers, one layer at a time, to form a weld joining the transducer to the housing. Welding in such a fashion serves to reduce or preferably eliminate the formation of air or gas bubbles between the housing and the tip of the transducer and which bubbles could act to "absorb" ultrasonic energy when applied to the housing via the ultrasonic apparatus, i.e., the transducer, generator, etc.

In general, ultrasonic energy transducers are either of a magnetostrictive-type or a piezoelectric-type. Some of the significant operating and performing variables of these types of transducers are identified in the Table I, below.

TABLE I

| | Piezoelectric | Magnetostrictive |
|---|---|---|
| Efficiency | High (70–80%) | Low (50%) |
| Temperature Limit | 150° F. | 350° F. |
| Life Expectancy | Short | Long |
| Operability | Sensitive | Rugged |

TABLE I-continued

| | Piezoelectric | Magnetostrictive |
|---|---|---|
| Tuning Frequency | Narrow Range | Wide Range |

Thus, for operation at temperatures above 150° F., the utilization of the more rugged magnetostrictive transducer will be preferred. However, for operation at low temperatures and for small or delicate applications, piezoelectric transducers would be preferred. Thus, for use of the invention in conjunction with filter elements used in the filtration of coke still gas oil, as described above, the relatively rugged and long-lived magnetostrictive transducer is thought preferred.

It is also to be understood that while in FIG. 3 only one ultrasonic transducer per unit is shown, the exact number of transducers utilized will be dependent on a number of factors including volume of the unit, energy output of the transducer, and nature of the fouling material, for example. Generally, however, it will be desired to maintain an ultrasonic power level of about 50 watts/gallon to about 5000 watts per gallon, and preferably about 100 watts/gallon to about 1000 watts/gallon, in the unit for effective material removal. Typical ultrasonic energy transducers provide from about 50 to about 500 watts of energy.

It is also to be understood that the transducer is to be joined to the filter housing in a fashion such that the point of joinder of the transducer and the housing generally corresponds to an antinodal point of the vibrational waves generated via the transducer, such that the maximum displacement of the oscillating action produced by the transducer will occur near and preferably at the point at which the transducer and housing are joined together. Further, if more than one transducer is to be utilized, then each of the transducers is preferably to be joined to the housing at a point coinciding with an antinodal point of the vibrational wave generated via the transducer.

While in theory the location of nodal and antinodal points for a perfect pipe can be calculated commercially, available pipes have varying thickness tolerances, and the location of these points cannot easily be accurately calculated therefor.

Consequently, one method to determine the location of the nodal and antinodal points of a vessel is to weld a transducer to the central portion of the exterior of the vessel and then energize the transducer while a fine alumina/water slurry is sprayed onto the vessel. The alumina particles will collect at the nodal points of the vessel which can then be marked. Using such a technique, the midpoints between consecutive nodal points will typically be free of alumina particles and will correspond to antinodal points, locations where transducers may preferably be joined to the housing with a predetermined and selected number of transducers subsequently being joined thereto.

In addition, the specific locations at which ultrasonic transducers are joined to a vessel when more than one transducer is used and when the transducers are to be joined to the housing along the length of the housing at selected antinodal points, can be in a straight, spiral or any other pattern provided that the transducers are preferably at such antinodal points. For example, FIG. 4 (A and B) and FIG. 5 (A and B) show simplified schematic diagrams of filtration units having multiple ultrasonic transducers joined thereto in a straight and a spiral pattern, respectively. In FIG. 4 (A and B), each of the transducers 120 and 122 are joined to the housing 128 in a straight line configuration. In FIG. 5 (A and B), each of the transducers 140, 142 and 144 are joined to the housing 148 in a spiral pattern wherein the junction of each successive transducer with the housing is offset from the next transducer by an angle of 180°.

In practice, a straight line arrangement may be preferred as such an arrangement may facilitate installation of housings having transducers joined thereto as such a pattern will generally result in a structure of minimal cross-sectional area.

Also, the inclusion of conical wave guides on the ultrasonic transducers may be preferred as such wave guides may result in improved realization of the ultrasonic generated vibrations on the filter housing, e.g., such wave guides can serve to increase the relative amount of energy from the generator which is transduced to mechanical vibrations which results in mechanical vibration of the housing.

Returning to FIG. 3, backflush liquid containing solids removed from the filter element being treated is removed from the unit 82a through the backflush outlet valve 98a to a backflush outlet stream 99.

As discussed above, the act of fluid flow reversal associated with backflushing will typically result in the dislodgement or removal of at least some of the fouling matter from the filter element being treated. In addition, the removal of fouling matter from the filter element during the process of backflushing is preferably assisted through the selection of a backflushing liquid which is at least partially solubilizing for the fouling matter or the materials adhering the fouling matter to the filter element. Thus, the backflushing liquid preferably comprises a solvent effective in at least partially solubilizing hydrocarbon materials of the fouling matter. Such a backflush liquid solvent will preferably be at conditions, including temperature, which are conducive to the solubilization of at least portions of the fouling matter.

In this fashion, the filter elements 84a of unit 82a may be cleaned in situ while other units (i.e., 82b, 82c ..., etc.) in the filter bank (system 14) are on-line and processing additional feed. Such a cyclic process of operation wherein the filter elements of one or more selected units are cleaned in situ while other units in the system remain on-line and process additional feed permits a more continuous mode of operation, as the frequency of the periodic removal for cleaning or replace of clogged filter elements from the respective units is significantly reduced.

In practice, the method of the invention can be done in a fashion in which the application of ultrasonic energy to and the backflushing of the fouled filter elements of a unit are done sequentially, preferably with the step of applying the ultrasonic energy preceding the backflushing step so that solids removed from a fouled element can be carried away with the backflush liquid or, if desired, simultaneously, with the backflushing step preferably being initiated prior to the application of ultrasonic energy to the fouled element, in a fashion so that the liquid in the unit and in which the element is immersed is transient, e.g., flowing, moving or otherwise passing through the element on a net basis, backflush liquid.

Of course, the application of the ultrasonic energy preferably should not be done during the actual filtration process wherein specified solids are separated from the feed to form a stream comprising liquid substantially free of the specified solids, as such an application would serve to hinder the removal or settling of solids from the solids-containing liquid feed onto the filter. Thus, in the practice of the invention, it is generally preferred to initially discontinue treatment of the solids-containing liquid feed through the unit prior to the application of ultrasonic energy to and the backflushing of the filter element. Consequently, when the backflushing step is initiated subsequent to the application of ultrasonic energy to the fouled element, the liquid in which the element will be immersed will comprise stationary liquid feed, e.g., liquid feed that is not flowing, moving or otherwise passing through the element on a net basis.

The following examples simulate the practice of the invention, showing the effectiveness of the application of various aspects of the invention and the significance of various operational parameters. It is to be understood that all changes and modifications that come within the spirit of the invention are desired to be protected, and thus the invention is not to be construed as limited by these examples.

EXAMPLES

For these examples, fouled filter elements removed from commercial filter units of a refinery were used. These filter units and associated filter elements had been used in the filtration of coker still gas oil. When new and/or clean, these filters typically have a cycle time of at least about 30 min to about 60 min or longer. At the time that these filter elements were removed from their associated filter units, the filter cycle time was less than about 5 min.

These fouled filter elements, as compared to new/clean, similar filter elements, had a layer of semi-coke, pitch-like material having a consistency similar to that of toothpaste on them.

EXAMPLES 1-3

For these examples, the filter elements were cut into small pieces of about 1 square inch, and the effect of the variables: 1) temperature, 2) solvent selection and 3) application of ultrasonic energy to the filter pieces soaked in the various solvents for cleaning treatment of the filter pieces was subjectively evaluated with the evaluator assigning a letter grade, i.e., A, B, C, D or F, for the cleanliness of the piece of filter element treated with the pieces of filter element having a rating/grading of F before any cleaning treatment thereof, as the filter pieces were substantially completely plugged and had a coating of coke/pitch-like material on them, a rating/grading of A signifying a substantially clean, virtually "like-new" cleanliness and the rating/gradings B, C, and D representing corresponding cleanliness levels therebetween.

Solvents tested included: 1) heavy catalytic naphtha (HCN), 2) light catalytic cycle oil (LCCO or LCO), 3) CFU product and 4) coke still gas oil (CSGO).

For these examples, a piece of the fouled filter element was soaked in a bath of toluene for about 15 to 20 min before being placed in a solvent bath. One set of runs were conducted with the solvent baths at room temperature. A second set of runs as conducted wherein the solvent baths were each at a temperature of about 155° F.

The third set of runs as conducted utilizing the specified solvent baths at a temperature of about 155° F. and to which ultrasonic energy was additionally applied.

After about 15-20 min in the specified solvent bath, with or without ultrasonic energy applied thereto as indicated, the filter pieces were removed from the respective baths and subsequently washed with toluene. A subjective cleaning rating was then given to each of the filter element pieces.

Table II below indicates the rating/gradings for filter pieces treated in each of the solvents at conditions of: 1) room temperature, 2) at a temperature of 155° F. and 3) at a temperature of 155° F. with ultrasonic energy applied thereto.

TABLE II

| Set | Condition | Solvents | | | |
|---|---|---|---|---|---|
| | | HCN | LCCO | CFU-Product | CSGO |
| 1 | Room Temperature | D | D | D | D |
| 2 | 155° F. | C | C | D+ | D |
| 3 | Ultrasonics at 155° F. | B+ | A | B− | B |

Discussion

After soaking the filter pieces at room temperature in each of one of the four solvents, the rating of the cleanliness of each of the filter pieces improved to a grade/rating level of D. This grading represented that though some of the pitch-like material had been removed from the filter pieces, the pores of the filter pieces were still substantially all plugged.

In the second set of runs, wherein the temperature of the bath was increased to 155° F., the ratings of the filter pieces which were treated in the heated HCN and LCCO baths, respectively, improved to a grade level of C while the rating of the filter piece samples treated in the heated CFU-product bath increased to a grade level of only D+, while the grade level of the filter piece that had been soaked in the heated CSGO bath remained at a grade level of D. These results signify that the heated HCN and LCCO baths and, to a minor extent, the heated CFU-product bath, solubilized relatively greater proportions of the pitch-like material from the filter pieces, as compared to baths using the same solvent material but at room temperature, while the effectiveness for the heated CSGO bath was comparable to an unheated bath of the same solvent material.

The rating/grade of the four filter pieces in baths of each of the solvents at the elevated temperature of about 155° F. and now additionally having ultrasonic energy applied thereto, improved dramatically to grade levels of B−, B, B+ and A for the CFU-product, CSGO, HCN and LCCO baths, respectively.

Thus, ultrasonic energy resulted in cleaning of the filter element pieces much better than any of the solvents alone, with the ultrasonic energy doing a better job of cleaning with the aromatic solvents of HCN and LCCO as compared to CSGO and CFU-product.

Examples 4-8

Procedure to quantify the cleanliness via the relative amount of open pores in a filter element:

A 40 watt light bulb was inserted inside the tested filter element. A LUX meter, a meter commonly used to measure light intensity, was placed on the outside of the tested filter element at a fixed distance of 1.5 inches from the surface of the filter element. (Note: LUX meters are commonly available from scientific and camera part suppliers.) The LUX rating so obtained provides a quantitative indication of the relative amount of open pores in the filter element.

Ultrasonic Apparatus and Procedure

A test filter housing was made of a 4 inch i.d. pipe. The filter element was placed inside the test housing from the top. The filter elements used in these examples were filter element triclusters each comprising 3 filter element legs each 36 inches long and 3/2 inches in diameter. The test filter housing was equipped with a piezoelectric-type ultrasonic transducer. In addition, heating tape and insulation were placed around the test filter housing so as to permit the heating thereof. A thermocouple was placed at the top of the test filter housing into one of the legs of the filter element.

Variables studied included:
1) solvent—LCCO and CFU product, respectively,
2) power of the ultrasonic transducers—500, 850 and 950 watts, respectively, and
3) time of cleaning—½ and 1 hr, respectively.

For the treatment of the filter elements, the filter elements were washed with toluene and then introduced through the top of the test housing after the specified solvent contained in the housing had been heated to a predetermined temperature of about 150° F. The filter elements were soaked in the bath of the specified solvent for a period of time of about 15 to 20 min. Subsequent to this soaking treatment, each of the filter elements was again washed with toluene.

LUX readings obtained for each of the treated filters were made at three locations along the length of each of the filter elements, respectively, and were averaged together and are shown in Table III below and, further, a visual inspection reading for each of the elements, respectively, is also noted.

In addition, the results of LUX and visual inspection readings for a fouled filter element prior to treatment (comparative example, Example 7) and a fouled filter element treated by being subjected to hydroblasting (comparative example, Example 8) are also provided in Table III.

TABLE III

| EXAMPLES | 4 | 5 | 6 | 7 | 8 |
|---|---|---|---|---|---|
| Treatment | | Ultrasonic Cleaned | | Plugged | Hydroblasted Clean |
| Solvent | CFU-Product | LCCO | LCCO | | |
| Power (W.) | 850 | 500 | 950 | | |
| Time (hr) | 1 | 1 | 0.5 | | |
| Illumination (LUX) | | | | | |
| Average of 3 | 22.7 | 38.2 | 57.2 | 1.5 | 58.2 |
| Visual Inspection | Dull Black | Dull Black | Shining Gray | Dull Black | Dull Black |

Discussion

The LUX readings for the original, fouled filter elements prior to any cleaning treatment were only 1.5.

The ultrasonically cleaned filter element which had been placed in a CFU-product bath (i.e., Example 4) had a LUX reading of 22.7, and the element appeared to be dull black, i.e., the visually inspected filter element appeared similar to that of the untreated filter element of comparative example, Example 7.

The ultrasonically cleaned filter element which had been placed in a LCCO solvent bath had LUX readings of 38.2 and 57.2 at transducer power levels of 500 watts and 950 watts for 1 hr and ½ hr treatments, respectively.

These results indicate that a bath of LCCO solvent was a better solvent for use in the practice of the invention in cleaning a fouled filter element than a bath of CFU-product solvent. Also, the higher transducer power level of 950 watts, even at a shorter application time of ½ hr, was more effective than the lower power transducer for a longer application time, i.e., the 500 watt transducer at an application time of 1 hr.

The LUX reading of a filter element which was cleaned in a standard way by hydroblasting (i.e., comparative example, Example 8) with high pressure water was 58.2, which was comparable to the LUX reading obtained for the ultrasonically cleaned filter element using a LCCO solvent bath and an ultrasonic power level of 950 watts for ½ hr. In addition, the filter element so treated was shining grey in color rather than dull black as were the filter elements treated in runs 4, 5, 7 and 8.

Examples 9-11

Using the ultrasonic apparatus and set-up described above in conjunction with Examples 4-6 and filter element triclusters as described above and as which were used in Examples 4-6, the application of ultrasonic energy via magnetostrictive ultrasonic transducers on filter triclusters using the solvent baths: LCCO, CFU-product and CSGO at temperature levels of 150° F., 250° F., 350° F. and 450° F., respectively, as shown were evaluated.

For each of Examples 9-11, the fouled filter element was placed in the specified solvent bath at the specified temperature and ultrasonic energy was applied thereto for 15 min.

As a point of reference, the fouled filter element, prior to the application of any cleaning treatment thereto, had a reading of about 1 to 2 LUX.

The results of Examples 9-11 are provided below in Table IV:

TABLE IV

| EXAMPLE | LUX READING | | |
|---|---|---|---|
| | 9 | 10 | 11 |
| SOLVENT BATH TEMPERATURE | LCCO | CFU-product | CSGO |
| 150° F. | 51 | — | — |
| 250° F. | 51 | 40 | 32 |
| 350° F. | 47 | 41 | 29 |
| 450° F. | 40 | 35 | 26 |

Discussion

As shown in Table IV wherein higher numerical LUX readings are indicative of cleaner, i.e., less fouled, filter elements, the highest LUX readings at each of the temperature levels at which each of the solvents were tested, i.e., temperatures of 250° F., 350° F. and 450° F., were obtained with Example 9, i.e., the LCCO solvent bath, ultrasonically treated filter element. In addition, at each of these temperatures, higher LUX readings were obtained for the CFU-product solvent bath (Example 10) ultrasonically treated filter element as compared to the similarly treated CSGO solvent bath (Example 11) filter elements. Further, for the LCCO solvent bath, ultrasonically treated filter elements, operation at the lower temperature range of 150° F.-250° F. provided superior readings to higher temperature operation, such as operation at temperatures of 350° F. and 450° F.

The foregoing detailed description is given for clearness of understanding only, and no unnecessary limitations are to be understood therefrom, as modifications within the scope of the invention will be obvious to those skilled in the art.

What is claimed is:

1. An in situ method for cleaning a solids-liquid separation element contained in an associated solids-liquid separator unit useful in the treatment of a solids-containing liquid feed to effect separation of specified solids from the feed to form a stream comprising liquid substantially free of said specified solids whereby during said separation said element becomes fouled with matter comprising solids separated form said feed, said method comprising the steps of:

applying ultrasonic energy, by means of at least one magnetostrictive ultrasonic transducer, to a fouled separation element in situ in the separator unit associated with said element while said element is immersed in a liquid in said unit to effect removal therefrom of solids fouling said element, said magnetostrictive transducer being joined to said associated separator unit at a point coinciding with an antinodal point of the vibrational wave generated via said transducer, and backflushing the separation element with a backflush liquid.

2. The method of claim 1 additionally comprising, prior to the application of ultrasonic energy to and the backflushing of said separation element, the step of discontinuing said treatment of the liquid feed through said unit for effecting separation of specified solids from the feed.

3. The method of claim 2 wherein the immersing liquid comprises stationary liquid feed and said backflushing step is initiated subsequent to the application of ultrasonic energy to said fouled separation element.

4. The method of claim 2 wherein said backflushing step is initiated prior to the application of ultrasonic energy to the fouled separation element and wherein the immersing liquid comprises transient backflush liquid.

5. The method of claim 4 wherein said solids-containing liquid feed comprises a hydrocarbon-containing refinery stream, the fouling matter additionally comprises fouling hydrocarbon materials and the backflush liquid comprises a solvent, at fouling matter solubilizing conditions including temperature, effective in at least partially solubilizing the hydrocarbon materials of the fouling matter.

6. The method of claim 5 wherein said hydrocarbon-containing refinery stream comprises coke still gas oil resulting from the fractionation of an oil feedstock and said solvent comprises a material selected from the group consisting of heavy catalytic naphtha and light catalytic cycle oil.

7. The method of claim 6 wherein said hydrocarbon-containing refinery stream additionally comprises at least one additional oil fraction selected from the group consisting of light gas oil, heavy gas oil, residual oil and combinations thereof.

8. The method of claim 1 wherein said separation element comprises a filter and said solids-liquid separator unit comprises a filter housing.

9. The method of claim 8 wherein said filter is selected from the group consisting of a sintered metal powder filter element, a ceramic filter element, a wound wire filter element and a wire gauge filter element.

10. An in situ method for cleaning a first filter, said filter being contained in an associated first filter housing and being useful in the treatment of a solids-containing liquid feed having a temperature of greater than 150° F. and comprising a hydrocarbon-containing refinery stream comprising coke still gas oil resulting from the fractionation of an oil feedstock, said treatment effecting separation of a predetermined relative amount of solids of at least a preselected size from said feed to form a stream comprising liquid substantially free of said specified solids whereby during said separation said filter becomes fouled with matter comprising solids separated from said feed and fouling hydrocarbon materials from said feed, said method comprising the steps of:
   applying ultrasonic energy to a fouled filter in situ in said associated filter housing, by means of at least one magnetostrictive ultrasonic transducer, while said filter is immersed in a liquid in said housing to effect removal of solids fouling said filter and
   backflushing the filter with a backflush liquid.

11. The method of claim 10 additionally comprising, prior to the application of ultrasonic energy to and the backflushing of said filter, the step of discontinuing said treatment of the liquid feed through said first filter housing for effecting separation of specified solids from the feed.

12. The method of claim 11 wherein the immersing liquid comprises stationary liquid feed and said backflushing step is initiated subsequent to the application of ultrasonic energy to said fouled filter.

13. The method of claim 11 wherein said backflushing step is initiated prior to the application of ultrasonic energy to said fouled filter and wherein the immersing liquid comprises transient backflush liquid.

14. The method of claim 13 wherein said backflush liquid comprises a solvent, at fouling matter solubilizing conditions including temperature, effective in at least partially solubilizing hydrocarbon materials of the fouling matter.

15. The method of claim 14 wherein said solvent comprises a material selected from the group consisting of heavy catalytic naphtha and light catalytic cycle oil.

16. The method of claim 15 wherein said hydrocarbon-containing refinery stream additionally comprises at least one additional oil fraction select from the group consisting of light gas oil, heavy gas oil, residual oil and combinations thereof.

17. The method of claim 10 wherein said filter is selected from the group consisting of a sintered metal powder filter element, a wound wire filter element and a wire gauge filter element.

18. The method of claim 10 wherein said at least one ultrasonic transducer is joined to said filter housing at a point coinciding with an antinodal point of the vibrational wave generated via the transducer.

19. The method of claim 10 wherein during said cleaning of said first filter, additional quantities of said feed are treated by a second filter contained in an associated second filter housing to effect separation of a predetermined relative amount of solids of at least a preselected size from said additional feed, said second housing being in parallel connection with said first housing to permit the simultaneous cleaning of the first housing and treatment of additional quantities of feed through the second housing.

20. A method for treating a solids-containing liquid feed comprising the steps of:
   passing said solids-containing liquid feed at a temperature of greater than 150° F. through a first solids-liquid separator unit containing a solids-liquid separation element effective to separate specified solids from said feed to form a stream comprising liquid substantially free of said specified solids, during which passage said separation element becomes fouled with matter comprising solids separated from said feed; and
   cleaning the fouled separation element of said first separation unit to effect removal therefrom of solids fouling said element by a cleaning method comprising the steps of applying ultrasonic energy by means of at least one magnetostrictive ultrasonic transducer to the fouled separation element in situ in said first separator unit associated with said element while said element is immersed in a liquid in said first unit and backflushing the fouled separation element with a backflush liquid, said cleaning step occurring while additional quantities of said feed are passed through a parallel second said unit containing a second said element effective to separate said specified solids from said additional quantities of said feed to form an additional liquid substantially free of said specified solids-comprising stream.

21. The method for treating a solids-containing liquid feed of claim 20 wherein said method of cleaning the fouled separation element additionally comprises the step prior to the application of ultrasonic energy to and backflushing of said separation element of discontinuing said treatment of the liquid feed for effecting separation of specified solids from the feed.

22. The method for treating a solids-containing liquid feed of claim 21 wherein the immersing liquid of said cleaning method comprises stationary liquid feed and said backflushing step is initiated subsequent to the application of ultrasonic energy to said fouled separation element.

23. The method for treating a solids-containing liquid feed of claim 24 wherein said backflushing step of said cleaning method is initiated prior to the application of ultrasonic energy to the fouled separation element and wherein the immersing liquid comprises transient backflush liquid.

24. The method for treating a solids-containing liquid feed of claim 23 wherein said solids-containing liquid feed comprises a hydrocarboncontaining refinery stream, the fouling matter additionally comprises fouling hydrocarbon materials and the backflush liquid comprises a solvent, at fouling matter solubilizing conditions including temperature, effective in at least partially solubilizing hydrocarbon materials of the fouling matter.

25. The method for treating a solids-containing liquid feed of claim 24 wherein said hydrocarbon-containing refinery stream comprises coke still gas oil resulting from the fractionation of an oil feedstock and said solvent comprises a material selected from the group consisting of heavy catalytic naphtha and light catalytic cycle oil.

26. The method for treating solids from a solids-containing liquid feed of claim 25 wherein said hydrocarbon-containing refinery stream additionally comprises at least one additional oil fraction selected from the group consisting of light gas oil, heavy gas oil, residual oil and combinations thereof.

27. The method for treating a solids-containing liquid feed of claim 20 wherein said separation element comprises a filter and said solids-liquid separator unit comprises a filter housing.

28. The method for treating a solids-containing liquid feed of claim 27 wherein said filter is selected from the group consisting of a sintered metal powder filter element, a ceramic filter element, a wound wire filter element and a wire gauge filter element.

29. The method for treating a solids-containing liquid feed of claim 20 wherein said at least one ultrasonic transducer is joined to said separator unit at a point coinciding with an antinodal point of the vibrational wave generated via the transducer.

30. The method for treating a solids-containing liquid feed of claim 20 wherein after said element of said first unit has been cleaned and said element of said second unit has become fouled, said method additionally comprising the steps of:

cleaning the fouled element of said second unit by said cleaning method while additional quantities of said feed undergo said passing step.

31. A filtration system useful in the filtering of gas oils having a temperature of greater than 150° F. resulting from the fractionation of an oil feedstock, said system comprising:

a filter element useful in separating specified solids from a feed comprising gas oils, said filter element contained in a filtration unit to which at least one magnetostrictive ultrasonic transducer is joined at a point coinciding with an antinodal point of the vibrational wave generated via the transducer and by which ultrasonic energy is periodically applied to said element while said element is immersed in liquid when said element has become fouled with matter comprising solids separated from said feed, said application of ultrasonic energy effecting removal of fouling solids from said element, and means for backflushing said filter element during cleaning thereof.

32. The system of claim 31 wherein said filter is selected from the group consisting of a sintered metal powder filter element, a wound wire filter element and a wire gauge filter element.

* * * * *